United States Patent
Guo et al.

(10) Patent No.: US 10,397,804 B2
(45) Date of Patent: Aug. 27, 2019

(54) WIRELESS ACCESS POINT SYSTEM, PORTABLE ELECTRONIC DEVICE ABLE TO CONTROL ANTENNA DIRECTION OF WIRELESS ACCESS POINT APPARATUS, AND METHOD FOR OPTIMIZING ANTENNA DIRECTION OF A WIRELESS ACCESS POINT APPARATUS

(71) Applicant: GIGA-BYTE TECHNOLOGY CO., LTD., New Taipei (TW)

(72) Inventors: Zhong-Yu Guo, New Taipei (TW); Min-Yuan Yang, New Taipei (TW); Chien-Hsiang Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/860,676

(22) Filed: Jan. 3, 2018

(65) Prior Publication Data

US 2019/0132748 A1    May 2, 2019

(30) Foreign Application Priority Data

Oct. 30, 2017    (TW) .............................. 106137476 A

(51) Int. Cl.
*H04W 16/28*    (2009.01)
*H04W 64/00*    (2009.01)
(Continued)

(52) U.S. Cl.
CPC .......... *H04W 16/28* (2013.01); *H04W 24/02* (2013.01); *H04W 64/00* (2013.01);
(Continued)

(58) Field of Classification Search
None
See application file for complete search history.

(56) References Cited

U.S. PATENT DOCUMENTS

2004/0174298 A1* 9/2004 Eriksson ................ H01Q 1/246
                                                            342/359
2009/0253439 A1* 10/2009 Gantner ................ G01S 5/0063
                                                            455/456.1
(Continued)

FOREIGN PATENT DOCUMENTS

| CN | 1658531 A | 8/2005 |
|---|---|---|
| CN | 102907121 A | 1/2013 |
| CN | 103841572 A | 6/2014 |
| CN | 102571166 B | 8/2016 |

(Continued)

OTHER PUBLICATIONS

Office Action issued in corresponding Japanese patent application dated Apr. 2, 2019.
(Continued)

*Primary Examiner* — Mohammed Rachedine
(74) *Attorney, Agent, or Firm* — Idea Intellectual Limited; Margaret A. Burke; Sam T. Yip

(57) ABSTRACT

A wireless access point system includes a wireless access point (WAP) apparatus, a location-setting module, and a portable electronic device. The location-setting module stores a location list recording a location and an optimum direction corresponding to the location. The portable electronic device has a detection mode and a connection mode. In the detection mode, the portable electronic device controls the WAP apparatus to radiate a wireless signal and change the radiation direction within a specified direction range. The portable electronic device analyzes the wireless signal to obtain the optimum direction having an optimum signal receiving strength, so as to update the location list with the optimum direction and the location corresponding to the optimum direction. In the connection mode, the portable electronic device loads the optimum direction corresponding to the location and controls the radiation direction to be adjusted as the loaded optimum direction.

15 Claims, 16 Drawing Sheets

(51) Int. Cl.
*H04W 24/02* (2009.01)
*H04W 88/08* (2009.01)
*H04W 72/04* (2009.01)

(52) U.S. Cl.
CPC ........ *H04W 72/046* (2013.01); *H04W 72/048* (2013.01); *H04W 88/08* (2013.01)

(56) References Cited

U.S. PATENT DOCUMENTS

| | | | |
|---|---|---|---|
| 2010/0297937 A1* | 11/2010 | Kim | H04B 7/1555 455/11.1 |
| 2016/0269132 A1 | 9/2016 | Clark et al. | |
| 2017/0181188 A1* | 6/2017 | Brisebois | H04W 16/28 |

FOREIGN PATENT DOCUMENTS

| | | |
|---|---|---|
| GB | 2375267 | 11/2002 |
| GB | 2433859 A | 7/2007 |
| JP | 2006217228 A | 8/2006 |
| JP | 2017168922 A | 9/2017 |
| KR | 20180056968 A | 5/2018 |
| WO | 2009041759 A1 | 4/2009 |
| WO | 2013032188 A2 | 3/2013 |
| WO | 2017109982 A1 | 6/2017 |

OTHER PUBLICATIONS

European Search Report of EP2018152371 dated Jul. 11, 2018.
Office Action issued in corresponding TW patent application No. 106137476 dated Aug. 10, 2018.

* cited by examiner

| Location List 210 | | |
|---|---|---|
| P1 | Vb1 | SL1 | Fr1 |
| P2 | Vb2 | SL2 | Fr2 |
| P3 | Vb3 | SL3 | Fr3 |
| P4 | Vb4 | SL4 | Fr4 |
| P5 | Vb5 | SL5 | Fr5 |
| P6 | Vb6 | SL6 | Fr6 |

Fig. 12

| Device Name of WAP Apparatus | |
|---|---|
| inputted location (list) | 2.4Ghz/5Ghz |
| band | Mbps |
| transmission speed | dBm |
| signal receiving strength | MB |
| data flow | hh/mm/ss |
| connection time | Fr |
| location usage count | |

Fig. 16

WIRELESS ACCESS POINT SYSTEM, PORTABLE ELECTRONIC DEVICE ABLE TO CONTROL ANTENNA DIRECTION OF WIRELESS ACCESS POINT APPARATUS, AND METHOD FOR OPTIMIZING ANTENNA DIRECTION OF A WIRELESS ACCESS POINT APPARATUS

CROSS-REFERENCE TO RELATED APPLICATION

This non-provisional application claims priority claim under 35 U.S.C. § 119(a) on Taiwan Patent Application No. 106137476 filed Oct. 30, 2017, the entire contents of which are hereby incorporated by reference.

BACKGROUND

Technical Field

The instant disclosure relates to techniques for adjusting wireless signals of a wireless access point apparatus, in particular, to a wireless access point system, a portable electronic device able to control antenna direction of wireless access point apparatus, and a method for optimizing antenna direction of a wireless access point apparatus.

Related Art

Along with developments of portable internet access devices, like smartphones or tablet computers, wireless internet access techniques are widely applied in daily lives. In offices or houses, people build their own wireless access point system (WAP system) with wireless routers and connect the system with the Internet or build a local area network (LAN) with the system. The signal radiation of antenna of the wireless router is usually directional, thus the wireless signal of the antenna can have an optimum signal receiving strength at a certain direction. However, the portable internet access devices move from one place to another, and the portable internet access devices do not always stay at a certain place for receiving the wireless signals with a certain radiation direction. Sometimes, the wireless signals are shielded, refracted, or reflected by signal shielding objects in indoor places.

The foregoing issue may be solved by increasing the radiation power; however, the radiation power is restricted by laws and regulations and has an upper limit. Another conventional approach to solve the foregoing issue is to provide an additional wireless network bridge to improve signal strength at certain regions or locations. Nevertheless, the wireless network bridge would also have the same problems the wireless router has. In addition, the wireless network bridge also increases the cost for establishing the WAP system.

SUMMARY

In view of these, a wireless access point system able to adjust antenna direction thereof, a portable electronic device able to control antenna direction of wireless access point apparatus, and a method for optimizing antenna direction of a wireless access point apparatus are provided.

One or some embodiments of the instant disclosure provide a wireless access point system able to adjust antenna direction thereof. The system comprises a wireless access point apparatus, a location-setting module, and a portable electronic device. The wireless access point apparatus has a directional antenna unit and an antenna-adjusting unit. The directional antenna unit is adapted to radiate a wireless signal having a radiation direction. The antenna-adjusting unit is adapted to receive a control instruction to adjust the radiation direction of the wireless signal. The location-setting module stores a location list, and the location list records a location and an optimum direction corresponding to the location. The portable electronic device establishes a wireless communication link with the wireless access point apparatus, and the portable electronic device comprises a wireless signal transceiver, a signal strength-analyzing module, and an antenna control module. The wireless signal transceiver is adapted to receive the wireless signal and transmit the control instruction. The signal strength-analyzing module is coupled to the wireless signal transceiver and analyzes a signal receiving strength of the wireless signal and the radiation direction corresponding to the signal receiving strength. The antenna control module is adapted to receive an input of the location and generate the control instruction to control the antenna-adjusting unit to change the radiation direction, and the antenna control module has a detection mode and a connection mode. In the detection mode, the antenna control module controls the wireless access point apparatus to radiate the wireless signal and change the radiation range within a specified direction range. The signal strength-analyzing module analyzes the wireless signal to obtain the optimum direction having an optimum signal receiving strength, so that the signal strength-analyzing module updates the location list with the optimum direction and the location corresponding to the optimum direction. In the connection mode, the antenna control module receives the input of the location, loads the optimum direction corresponding to the location, and controls the radiation direction to be adjusted as the optimum direction being loaded.

In one or some embodiments, the directional antenna unit comprises at least two directional antennas, and the antenna-adjusting unit is adapted to adjust signal outputs of the at least two directional antennas to provide the wireless signal and the radiation direction.

In one or some embodiments, the directional antenna unit comprises at least one directional antenna, and the antenna-adjusting unit is a rotatable base holding the at least one directional antenna and adjusting the radiation direction of the wireless signal.

In one or some embodiments, the location-setting module is combined with one of the wireless access point apparatus and the portable electronic device.

In one or some embodiments, the location list further records a location usage count at the location where the portable electronic device and the wireless access point apparatus establish the wireless communication link. Before the antenna control module enters into the detection mode, the wireless access point apparatus, according to a location having a highest location usage count, loads the optimum direction corresponding to the location having the highest location usage count and adjust the radiation direction of the wireless signal.

According to one or some embodiments of the instant disclosure, a portable electronic device able to control antenna direction of wireless access point apparatus is adapted to receive a wireless signal having a radiation direction radiated by a wireless access point apparatus, and the portable electronic device is adapted to establish a wireless communication link with the wireless access point apparatus. The portable electronic device comprises a location-setting module, a wireless signal transceiver, a signal strength-analyzing module, and an antenna control module. The location-setting module stores a location list. The location list records a location and an optimum direction corresponding to the location. The wireless signal transceiver is adapted to receive the wireless signal and transmit a control instruction. The signal strength-analyzing module is coupled to the wireless signal transceiver and analyzes a signal receiving strength of the wireless signal and the radiation direction corresponding to the signal receiving strength. The antenna control module is adapted to receive an input of the location and generate the control instruction to control the wireless access point apparatus to change the radiation direction, and the antenna control module has a detection mode and a connection mode. In the detection mode, the antenna control module controls the wireless access point apparatus with the control instruction, and the antenna control module controls the wireless access point to radiate the wireless signal and change the radiation within a specified direction range direction. The signal strength-analyzing module receives the wireless signal via the wireless signal transceiver and obtains an optimum direction having an optimum signal receiving strength, so that the signal strength-analyzing module updates the location list with the optimum direction and the location corresponding to the optimum direction. In the connection mode, the antenna control module receives the input of the location, loads the optimum direction corresponding to the location, and controls the radiation direction of the wireless signal radiated by the wireless access point apparatus to be adjusted as the optimum direction being loaded.

In one or some embodiments, the location-setting module is combined with the portable electronic device.

In one or some embodiments, the location list further records a location usage count at the location where the portable electronic device and the wireless access point apparatus establish the wireless communication link. Before the antenna control module enters into the detection mode, the wireless access point apparatus, according to a location having a highest location usage count, loads the optimum direction corresponding to the location having the highest location usage count and adjust the radiation direction of the wireless signal.

In one or some embodiments, in the connection mode, if the inputted location does not exist in the location list, the antenna control module stops the connection mode and starts the detection mode.

In one or some embodiments, the antenna control module executes the connection mode after the antenna control module executes the detection mode.

In one or some embodiments, after the radiation direction of the wireless signal radiated by the wireless access point apparatus is adjusted as the optimum direction being loaded, the antenna control module takes the optimum direction as a standard to control the wireless access point apparatus to change the radiation direction within an auxiliary direction range, and the antenna control module controls the signal strength-analyzing module to analyze if a signal receiving strength of another radiation direction is greater than the signal receiving strength of the optimum direction. If yes, the optimum direction is replaced by the another radiation direction, and the location list is updated.

In one or some embodiments, when the antenna control module updates the location list of the location-setting module with the optimum direction and the location, at the same time the antenna control module writes the signal receiving strength corresponding to the optimum direction in the location list. After the antenna control module controls the radiation direction of the wireless signal radiated by the wireless access point apparatus to be adjusted as the optimum direction being loaded, the signal strength-analyzing module analyzes if a difference value between a real signal receiving strength and the signal receiving strength of the optimum direction is greater than a threshold value. If the difference value is greater than the threshold value, antenna control module executes the detection mode again.

According to one or some embodiments of the instant disclosure, a method for optimizing an antenna direction of wireless access point apparatus is further provided. The method comprises receiving a wireless signal radiated by a wireless access point apparatus; receiving an input of a location and updating the location in a location list; transmitting a control instruction to control the wireless access point apparatus to radiate the wireless signal and change a radiation direction within a specified direction range; analyzing a signal receiving strength of the wireless signal and the radiation direction corresponding to the signal receiving strength to obtain an optimum direction having an optimum signal receiving strength; and establishing a correspondence between the optimum direction and the location in the location list.

In one or some embodiments, the method further comprises checking if the location exists in the location list after the input of the location is received; if the location does not exist in the location list, executing subsequent steps; and if the location exists in the location list, according to the input of the location, loading the optimum direction corresponding to the location from the location list and controlling the wireless access point apparatus to adjust the radiation direction as the optimum direction being loaded.

In one or some embodiments, the location list further records a location usage count at the location where the wireless access point apparatus establishes a wireless communication link. Before the wireless access point apparatus receives the input of the location, the wireless access point apparatus, according to a location having a highest location usage count, loads the optimum direction corresponding to the location having the highest location usage count and adjust the radiation direction of the wireless signal.

In one or some embodiments, the method further comprises changing the radiation direction within an auxiliary direction range by taking the optimum direction as a standard and analyzing if a signal receiving strength of another radiation direction is greater than the signal receiving strength of the optimum direction after the radiation direction of the wireless signal radiated by the wireless access point apparatus is adjusted as the optimum direction being loaded. If yes, replacing the optimum direction by the another radiation direction and updating the location list.

In one or some embodiments, the method further comprises analyzing if a difference value between a real signal receiving strength and the signal receiving strength of the optimum direction is greater than a threshold value after the radiation direction of the wireless signal is adjusted as the optimum direction being loaded. If the difference value is greater than the threshold value, obtaining the optimum direction having the optimum signal receiving strength again.

According to some embodiments of the instant disclosure, the radiation direction of the wireless access point apparatus can be controlled by the portable electronic device to have an optimum or acceptable signal strength, based on the location of the portable electronic device. Therefore, the adverse effects of the signal receiving location toward the signal strength can be reduced effectively.

BRIEF DESCRIPTION OF THE DRAWINGS

The disclosure will become more fully understood from the detailed description given herein below for illustration only, and thus not limitative of the disclosure, wherein:

FIG. 12 illustrates a schematic view of another embodiment of the location list in the method;

FIG. 16 illustrates a schematic view of the signal receiving strength of the wireless signal displayed by the portable electronic device.

DETAILED DESCRIPTION

Figure 1:
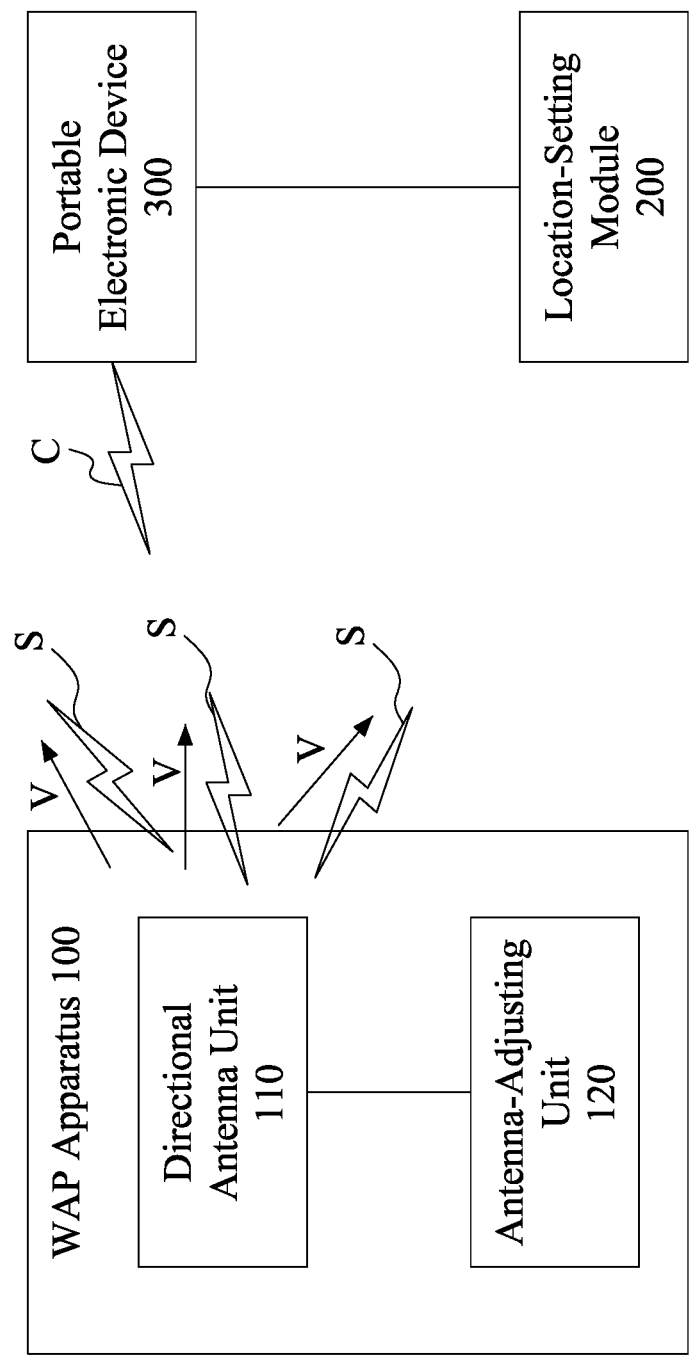
FIG. 1 illustrates a circuit block diagram of a wireless access point system able to adjust antenna direction thereof according to an exemplary embodiment of the instant disclosure.
Figure 2:
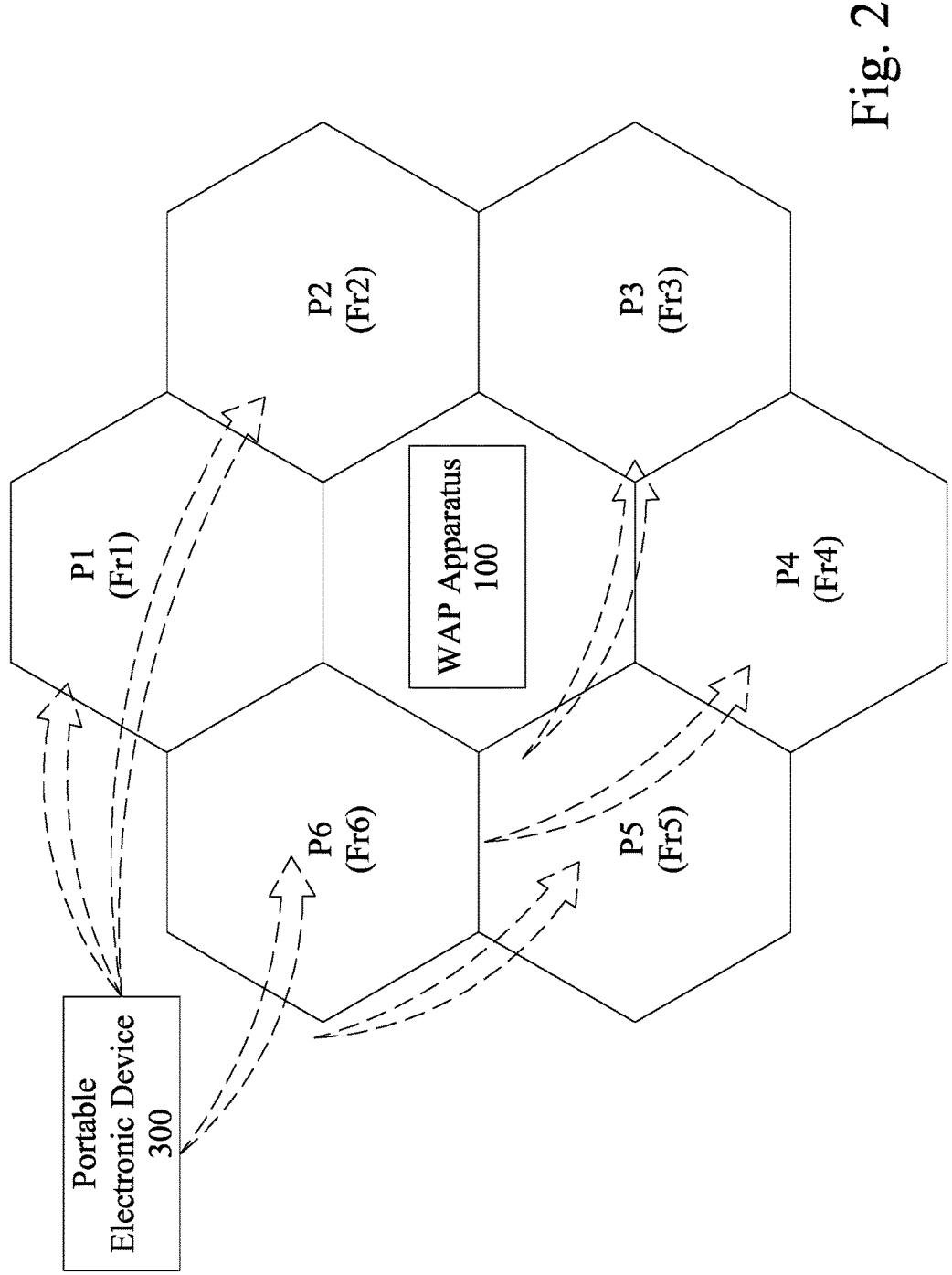
FIG. 2 illustrates a systematic view of the wireless access point system.

Please refer to FIG. 1. FIG. 1 illustrates a circuit block diagram of a wireless access point system (WAP system) able to adjust antenna direction thereof according to an exemplary embodiment of the instant disclosure. The WAP system comprises a wireless access point apparatus 100 (WAP apparatus 100), a location-setting module 200, and a portable electronic device 300. As shown in FIG. 2, the portable electronic device 300 is moved among a plurality of locations (P1 to P6), and the radiation range of the wireless signal of the wireless access point apparatus 100 covers these locations (P1 to P6). However, it is understood that, these locations (P1 to P6) may correspond to different wireless access point apparatuses 100. At different locations (P1 to P6), the portable electronic device 300 may control the corresponding WAP system to adjust the antenna direction of the corresponding wireless access point apparatus 100. In one embodiment, the wireless access point apparatus 100 is a home-use wireless router, the portable electronic device 300 is a wireless internet access device, and the portable electronic device 300 is adapted to establish a wireless communication link with the wireless access point apparatus 100. The portable electronic device 300 may be, but not limited to, a smartphone, a tablet computer, or a notebook computer. The locations (P1 to P6) are different living areas in the house (i.e., different rooms).

As shown in FIG. 1, the wireless access point apparatus 100 has a directional antenna unit 110 and an antenna-adjusting unit 120. The directional antenna unit 110 is used to radiate a wireless signal S having a radiation direction V. The antenna-adjusting unit 120 is used to receive a control instruction C to adjust the directional antenna unit 110 to adjust the radiation direction V of the wireless signal S. The way for adjusting the radiation direction V may be mechanical or electrical, depending on the form of the directional antenna unit 110.

Figure 3:
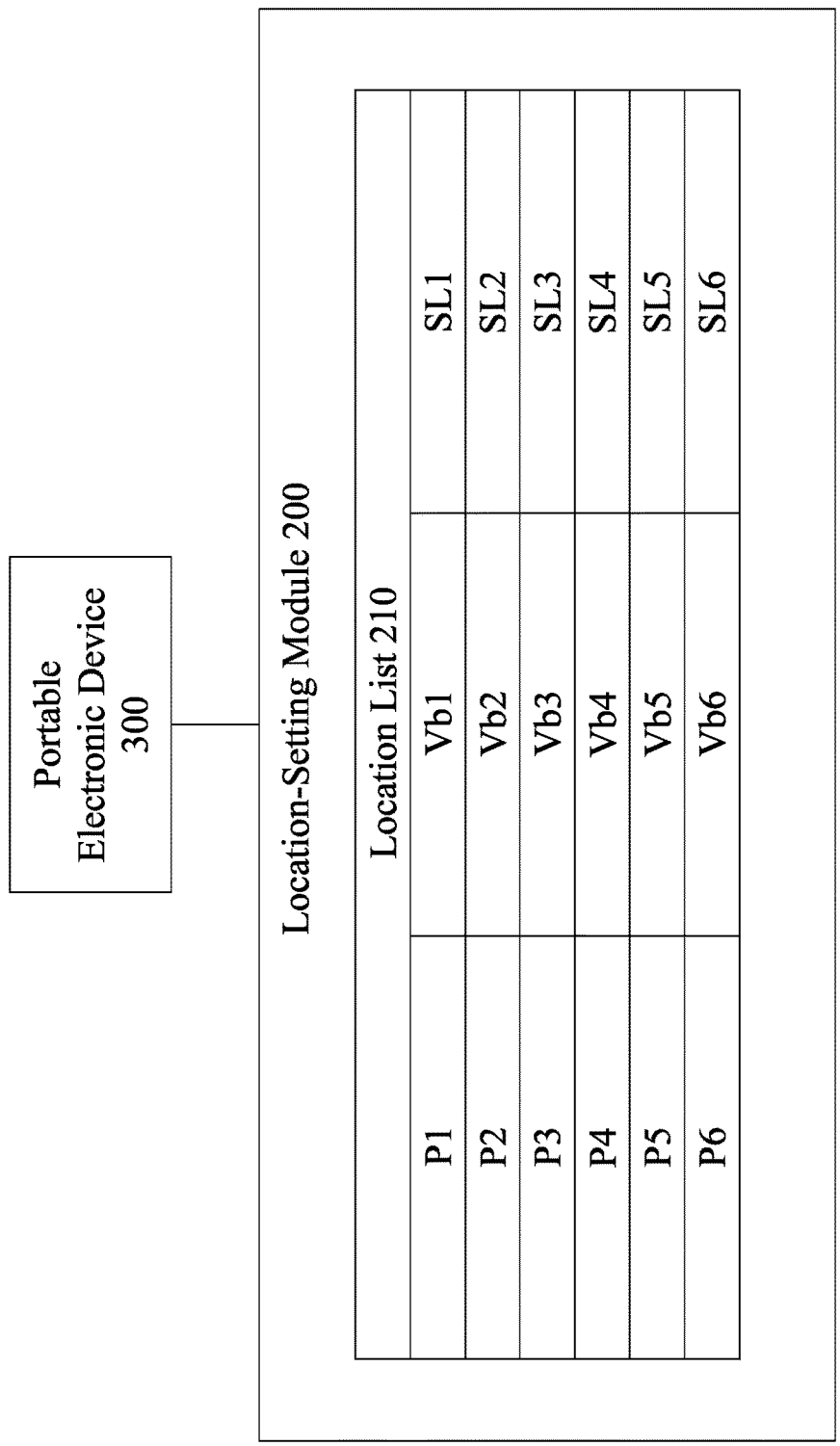
FIG. 3 illustrates a schematic view of the location-setting module and the location list of the wireless access point system.

As shown in FIGS. 1 and 3, the location-setting module 200 stores a location list 210. The location list 210 records a plurality of locations (P1 to P6), optimum directions (Vb1 to Vb6) respectively corresponding to the locations (P1 to P6), and optimum signal receiving strengths (SL1 to SL6) respectively corresponding to the locations (P1 to P6).

Figure 4:
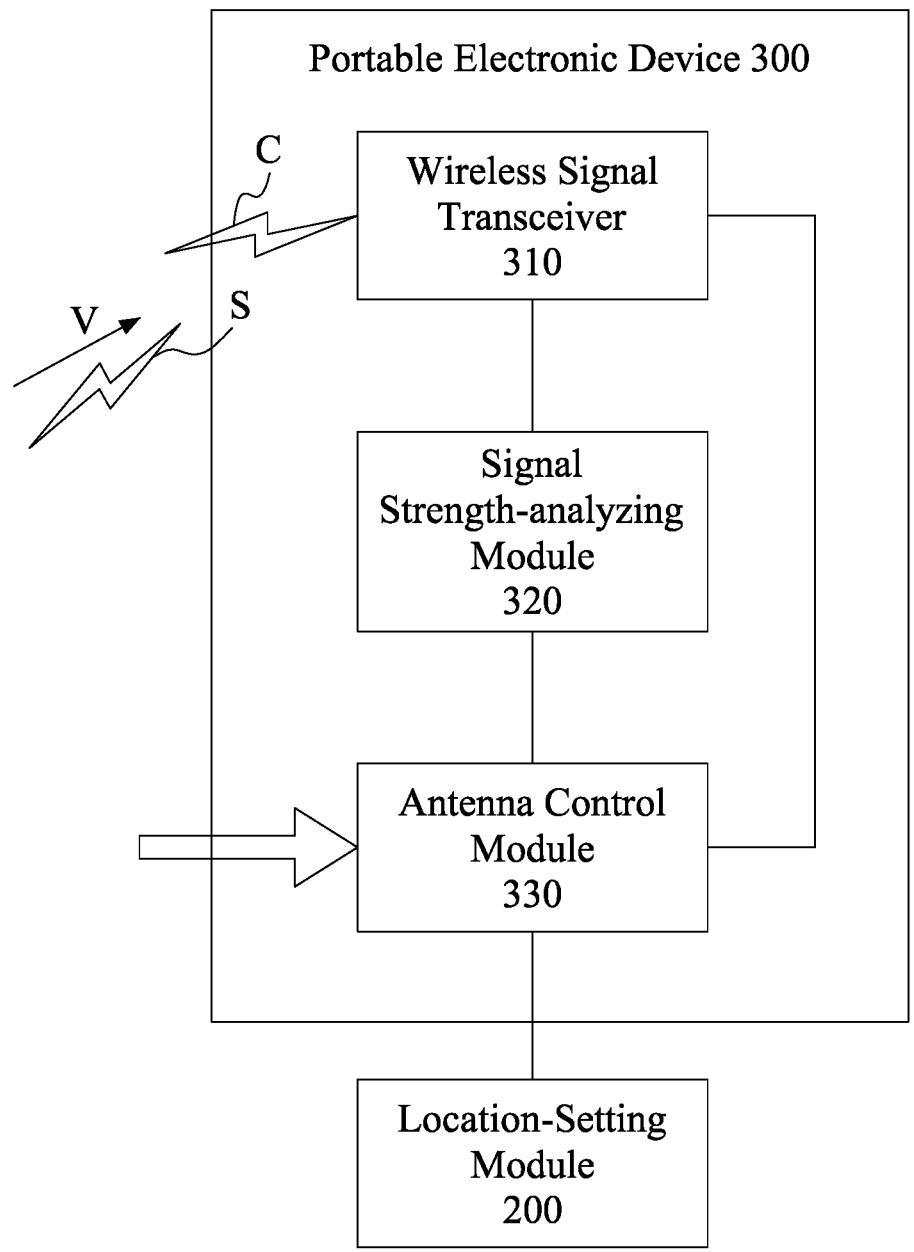
FIG. 4 illustrates a circuit block diagram of the portable electronic device of the wireless access point system.

As shown in FIGS. 1 and 4, the portable electronic device 300 has a wireless signal transceiver 310, a signal strength-analyzing module 320, and an antenna control module 330. The wireless signal transceiver 310 is adapted to receive the wireless signal S and is adapted to transmit the control instruction C. The signal strength-analyzing module 320 is coupled to the wireless signal transceiver 310 to analyze a signal receiving strength of the wireless signal S and the radiation direction V corresponding to the signal receiving strength.

The antenna control module 330 is adapted to receive an input of a location (P1 to P6). The location may be inputted with detailed information of the current location (P1 to P6) of a user by the user manually, or the location of the user may be detected and inputted in an automatic manner. For example, radio frequency identification (RFID) tags may be provided nearby the locations (P1 to P6), so that the portable electronic device 300 can detect the current location (P1 to P6). In the case that the location (P1 to P6) is inputted by the user manually, the location (P1 to P6) may be selected from a list. For example, when the system of the embodiment is installed in the house, the house may be divided into different living areas (i.e., the locations) in advance. Next, a selection list is provided to record the locations (P1 to P6). Therefore, the user of the portable electronic device 300 can select the location (P1 to P6) where he or she is by the selection list. The antenna control module 330 is adapted to transmit a control instruction C to control the antenna-adjusting unit 120 to change the radiation direction V, and the modes of the antenna control module 330 for controlling the antenna-adjusting unit 120 comprises a detection mode and a connection mode.

As shown in FIGS. 2 and 3, when the portable electronic device 300 is not in the locations (P1 to P6) of the location list 210, the detection mode may be activated. In the detection mode, the antenna control module 330 transmits the control instruction C via the wireless signal transceiver 310 to control the wireless access point apparatus 100 to radiate the wireless signal S changes the radiation direction V within a specified direction range and. For example, the radiation direction V is rotated by 360 degrees in a horizontal plane and then further rotated by 180 degrees in a vertical plane. During the rotation of the radiation direction V, the wireless signal transceiver 310 may continuously receive the wireless signal S or may sample the wireless signal S every time the radiation direction V is rotated by a certain angle. Next, the wireless signal transceiver 310 transmits the wireless signal S to the signal strength-analyzing module 320. The signal strength-analyzing module 320 can analyze the received wireless signal S to obtain the radiation direction V having an optimum signal receiving strength (SL1 to SL6) as the optimum direction (Vb1 to Vb6). Hence, the location list 210 of the location-setting module 200 is updated according to the optimum direction (Vb1 to Vb6), the location (P1 to P6) corresponding to the optimum direction (Vb1 to Vb6), and the optimum signal receiving strength (SL1 to SL6) corresponding to the optimum direction (Vb1 to Vb6). It is understood that, when the portable mobile device 300 is in the location (P1 to P6) stored in the location list 210, the portable electronic device 300 can activate the detection mode automatically or by user's manual operations.

As shown in FIGS. 2 and 3, when the current location (P1 to P6) of the portable mobile device 300 is stored in the location list 210, the portable mobile device 300 may activate the connection mode directly. After the user inputs or selects the current location (one of P1 to P6) manually, the antenna control module 330 receives the input of the location (P1 to P6) and loads the optimum direction (Vb1 to Vb6) corresponding to the current location (P1 to P6) according to the input of the current location (P1 to P6). Then, the antenna control module 330 transmits the control instruction C to control the radiation direction V of the wireless signal S radiated by a directional antenna 112a of the directional antenna unit 110 to be adjusted as the optimum direction (Vb1 to Vb6) being loaded. Hence, a wireless communication link with a relatively better connection quality can be thus established between the portable mobile device 300 and the wireless access point apparatus 100.

Figure 5:
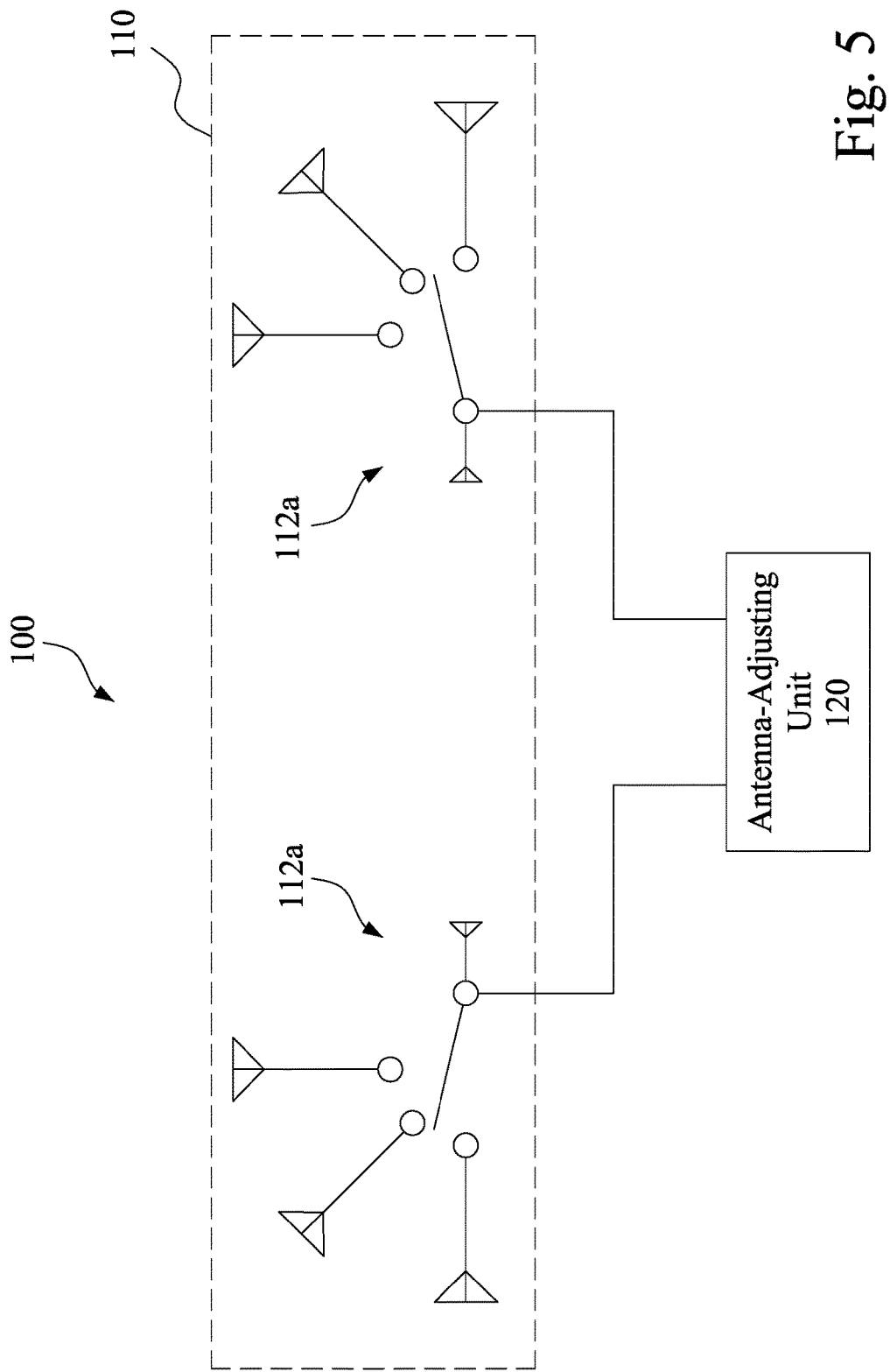
FIG. 5 illustrates a circuit block diagram of the wireless access point apparatus of the wireless access point system.

Please refer to FIG. 5, in one or some embodiments, the directional antenna unit 110 comprises two or more directional antennas 112a. Each of the directional antennas 112a has a fixed radiation direction V, or the directional antennas 112a may change the radiation directions V at different planes (for example, the horizontal plane and the vertical plane). The directional antenna 112a may be a PCB planar inverted-F antenna (PCB PIFA) or other antennas like a Dipole antenna or a Monopole antenna. The directional antennas 112a are coupled to the antenna-adjusting unit 120. The antenna-adjusting unit 120 switches the antenna position by a multi-task control circuit to adjust the signal outputs of the two directional antennas 112a (e.g., the signal strength and the direction of each antenna) to provide the wireless signal S and the radiation direction V.

Figure 6:
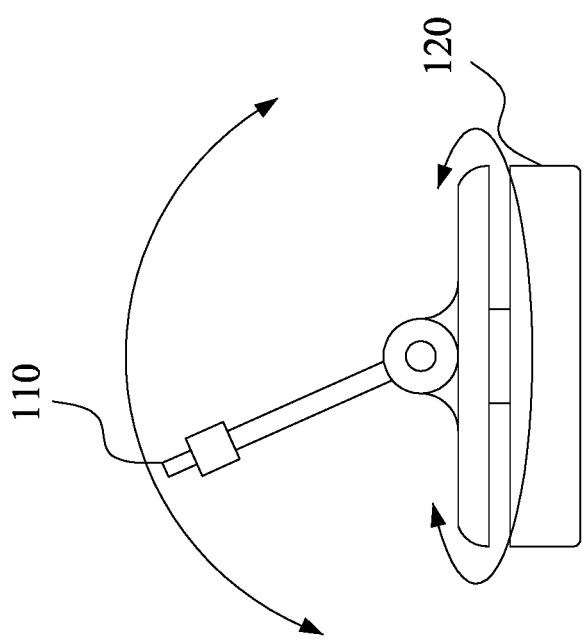
FIG. 6 illustrates a schematic view of another embodiment of the wireless access point apparatus.

Please refer to FIG. 6. In one or some embodiments, the directional antenna unit 110 is a mechanical directional antenna unit. In such embodiment, the directional antenna unit 110 is a directional antenna, and the antenna-adjusting unit 120 is a rotatable base with one or more axis. The antenna-adjusting unit 120 holds the directional antenna and adjusts the radiation direction V of the wireless signal S radiated by the directional antenna.

Figure 7:
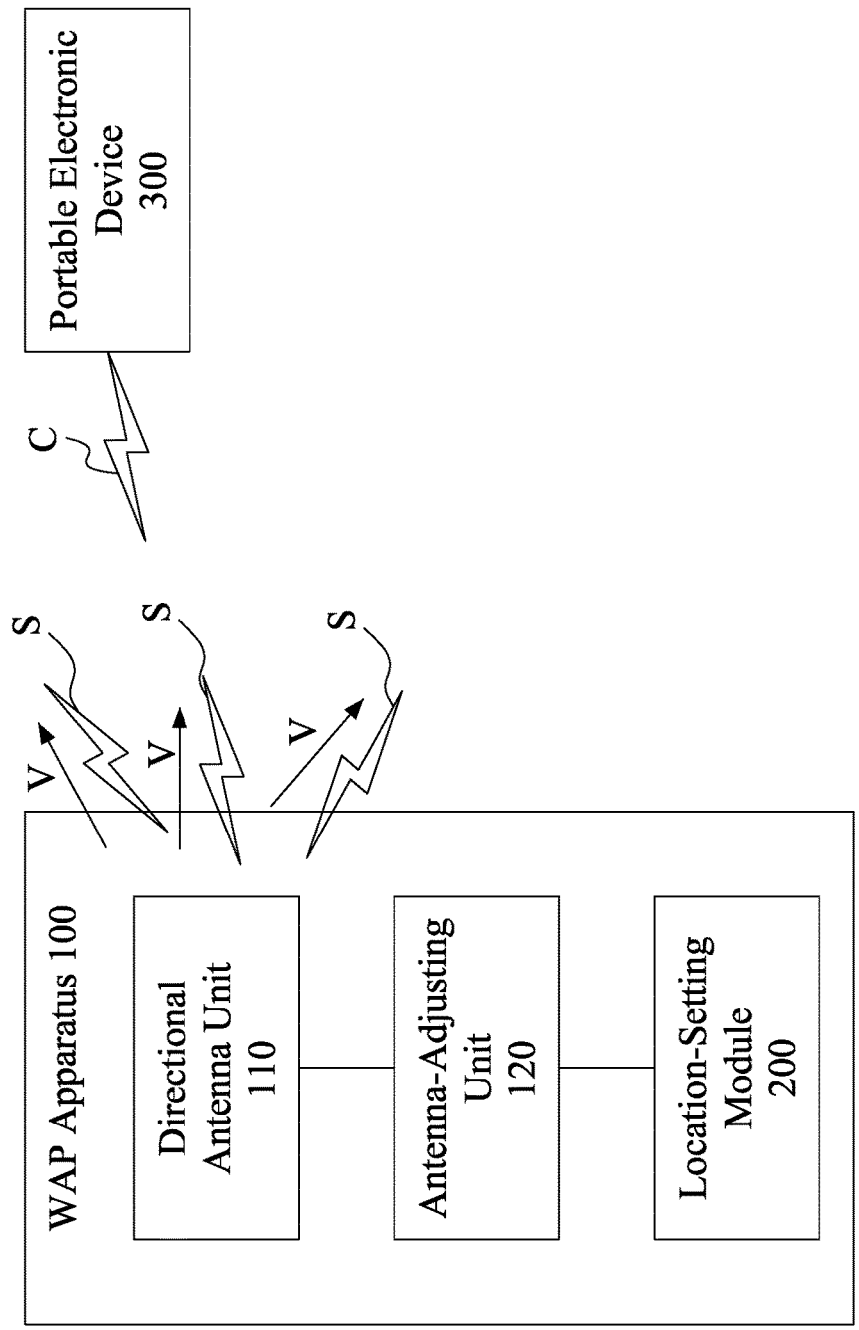
FIG. 7 illustrates a circuit block diagram of yet another embodiment of the wireless access point apparatus.
Figure 8:
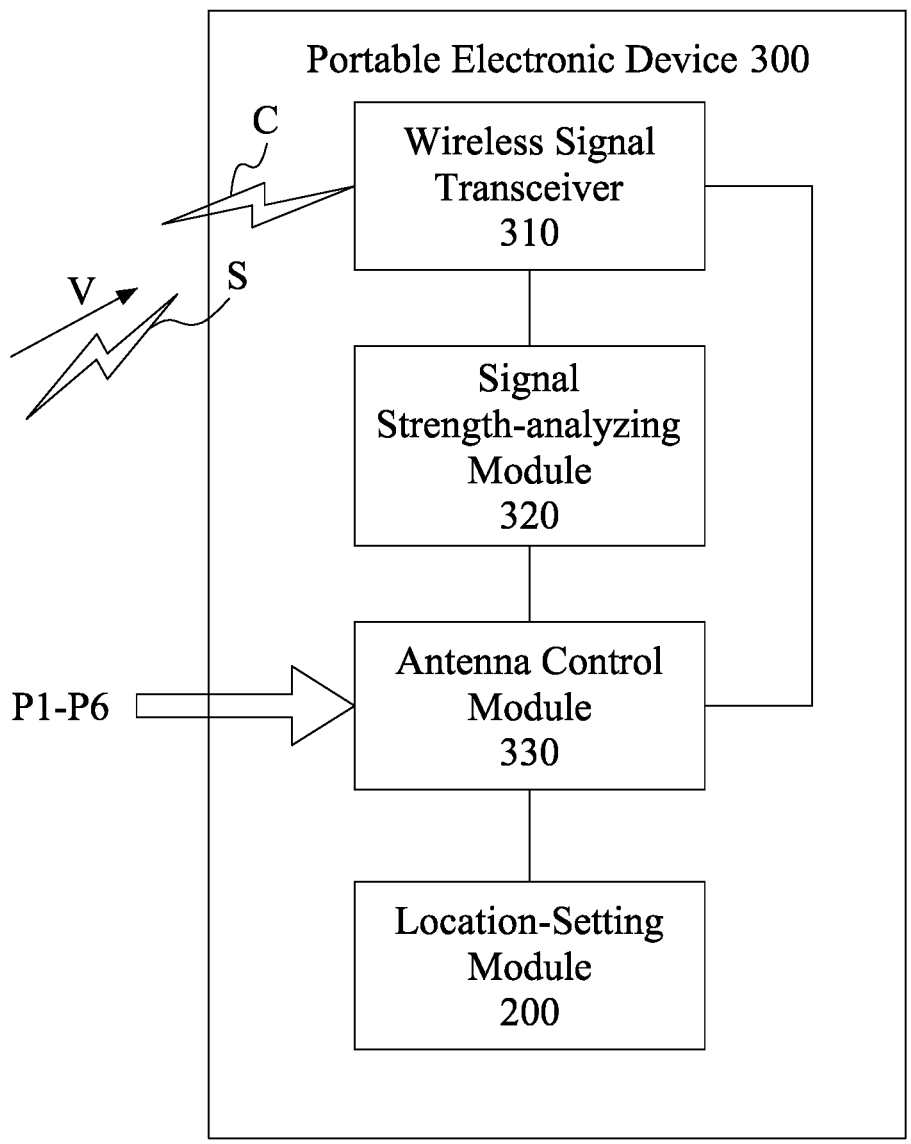
FIG. 8 illustrates a circuit block diagram of the another embodiment of the portable electronic device.

As shown in FIGS. 7 and 8, the location-setting module 200 is adapted to store the location list 210, and the location list 210 can be updated or can be loaded in the portable mobile device 300.

As shown in FIG. 7, in one or more embodiments, the location-setting module 200 is combined with the wireless access point apparatus 100. The combination of the location-setting module 200 and the wireless access point apparatus 100 may be achieved by a built-in software or hardware module, or a detachable external storage device. After the portable electronic device 300 and the wireless access point apparatus 100 establishes the wireless communication link, the location-setting module 200 is adapted to allow the portable electronic device 300 to obtain the location list 210 via the wireless access point apparatus 100 in wireless transmission. In the embodiment shown in FIG. 9, the location-setting module 200 may store a plurality of location lists 210 respectively belonging to different portable electronic devices 300.

As shown in FIG. 8, in one or more embodiments, the location-setting module 200 is combined with the portable electronic device 300 and stores a location list 210 just specified for the portable electronic device 300. However, the location list 210 may comprise settings of the radiation direction V for different wireless access point apparatuses 100. Therefore, the embodiment shown in FIG. 8 provides a portable electronic device 300 able to control the antenna direction of the wireless access point apparatus 100, and the portable electronic device 300 comprises a wireless signal receiver 310, a signal strength-analyzing module 320, a location-setting module 200, and an antenna control module 330. The antenna control module 330 has a detection mode and a connection mode. In the embodiment shown in FIG. 8, the location-setting module 200 may be a built-in software or hardware module of the portable electronic device 300, or may be a detachable external storage device. In practice, the signal strength-analyzing module 320, the antenna control module 330, and the location-setting module 200 can be built up by software modules, so that these modules can be integrated as a single application program installed in the portable electronic device 300. Hence, the wireless signal transceiver 310 and other hardware resources of the portable electronic device 300 can be controlled by software to build corresponding software modules.

Figure 9:
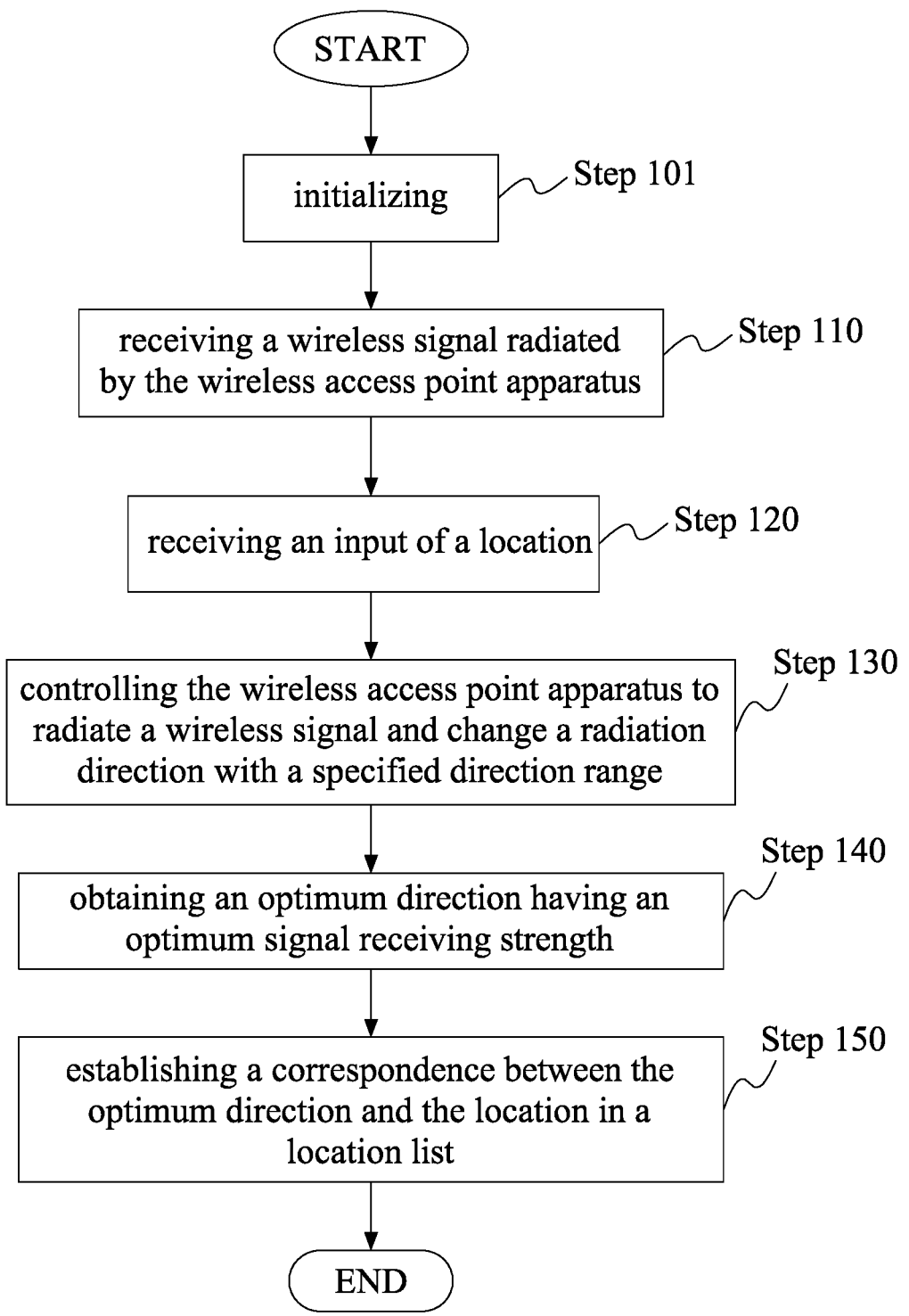
FIG. 9 illustrates a flowchart of the detection mode in the method for optimizing antenna direction of a wireless access point apparatus.

Please refer to FIG. 9, illustrating a method for optimizing antenna direction or a wireless access point apparatus 100 according one or some embodiments of the instant disclosure, and the steps of the method are described as below.

Firstly, when the portable electronic device 300 is in the radiation range of the wireless access point apparatus 100, the portable electronic device 300 may transmit an initialization signal via the wireless signal transceiver 310 to handshake with the wireless access point apparatus 100 to establish a communication link so as to initialize the link between the portable electronic device 300 and the wireless access point apparatus 100, as shown in the Step 101.

Next, receiving a wireless signal S radiated by the wireless access point apparatus 100 with the portable mobile device 300, as shown in Step 110. The aforementioned wireless signal S also comprises parameters related to signal radiation, like reference signal strength and radiation direction V.

Next, according to user's input or other location detection ways, the portable electronic device 300 receives an input of a location (P1 to P6) and updates the location (P1 to P6) in a location list 210, as shown in Step 120. It is understood that the execution order of Step 110 and Step 120 can be exchanged or these steps may be executed at the same time. The term "Updating the location (P1 to P6) in a location list 210" is checking if the current location (P1 to P6) is matched with the location (P1 to P6) recorded in the location list 210. If no, the current location (P1 to P6) is recorded as a location and written into the location list 210.

The portable electronic device 300 executes the detection mode. The portable electronic device 300 transmits a control instruction C to control the wireless access point apparatus 100 to radiate a wireless signal S and change the radiation direction V with a specified direction range, as shown in Step 130. The aforementioned direction range may be a certain angle range in the vertical direction or the horizontal direction, or may be changed within the maximum changeable range (e.g., 180 degrees in the vertical direction and 360 degrees in the horizontal direction) of the radiation direction V. The parameters of the radiation direction V may be packaged in data packets and radiated along with the radiation of the wireless signal S.

When the wireless access point apparatus 100 continuously radiates the wireless signal S and changes the radiation direction V, the portable electronic device 300 receives the wireless signal S via the wireless signal transceiver 310 and transmits the wireless signal S to the signal strength-analyzing module 320. The signal strength-analyzing module 320 receives the wireless signal S and resolves the radiation direction V from the data packets to analyze the signal receiving strength of the wireless signal S and the radiation direction V corresponding to the signal receiving strength. Then, the signal strength-analyzing module 320 obtains an optimum direction Vb having an optimum signal receiving strength among several signal receiving strengths and radiation directions V corresponding to the signal receiving strengths, as shown in Step 140.

Next, the signal strength-analyzing module 320 updates the optimum direction Vb in the location list 210 and establishes a correspondence between the optimum direction Vb and the current location (P1 to P6) in the location list 210, as shown in Step 150.

Through the foregoing Step 110 to Step 150, the portable electronic device 300 can execute the detection mode.

Figure 10:
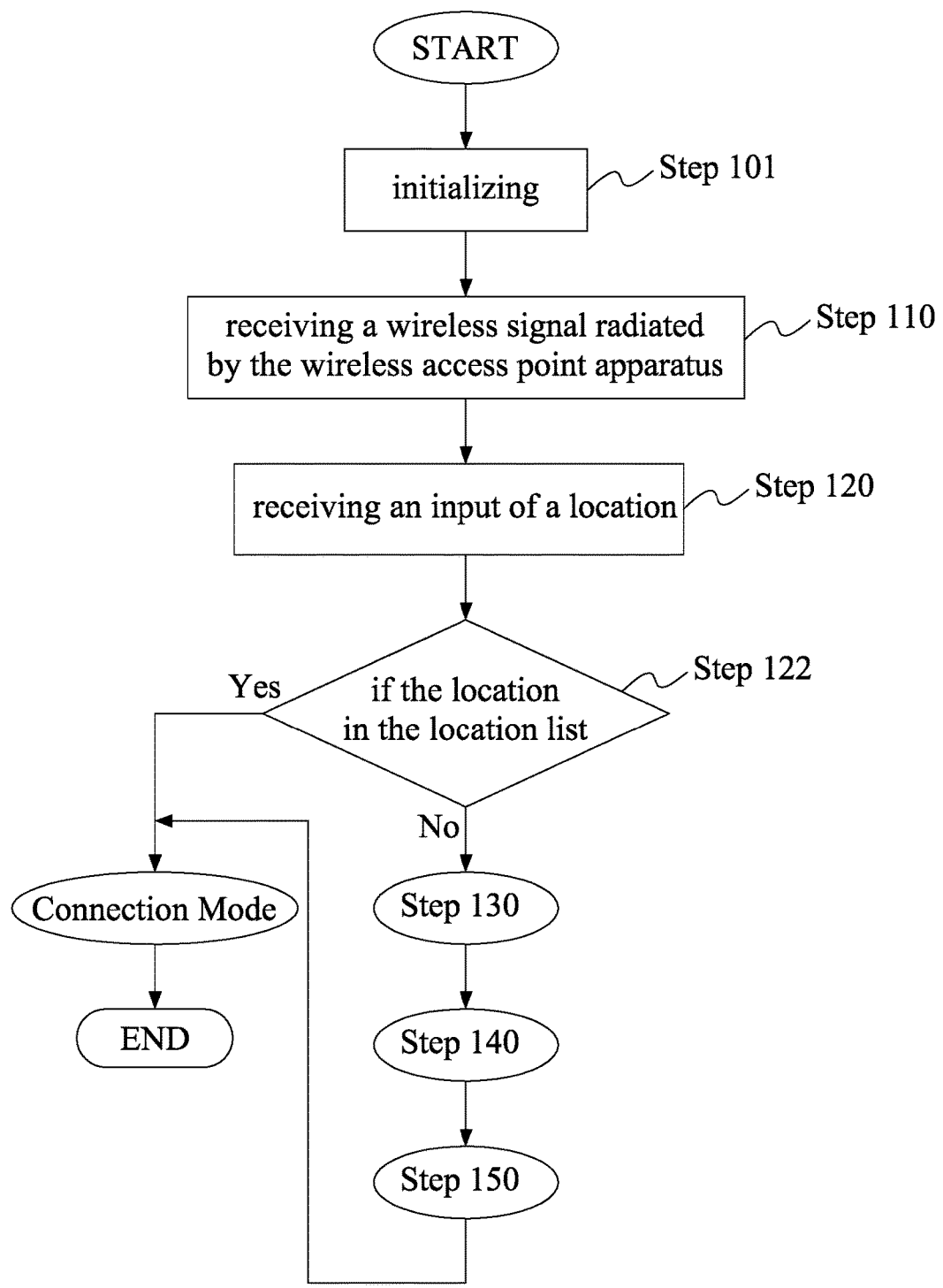
FIGS. 10 and 11 illustrate flowcharts of the connection mode in the method.

As shown in FIG. 10, in one or some embodiments, Step 120 may be further divided into following sub-steps.

After the input of the location (P1 to P6) is received, checking if the location (P1 to P6) exists in the location list 210, as shown in Step 122.

In the checking procedure of Step 122, if the location (P1 to P6) does not exist in the location list 210, executing the subsequent steps (i.e., Steps 130 to 150) to achieve the detection mode.

In the checking procedure of Step 122, if the location (P1 to P6) exists in the location list 210, stopping the detection mode and starting the connection mode.

Figure 11:
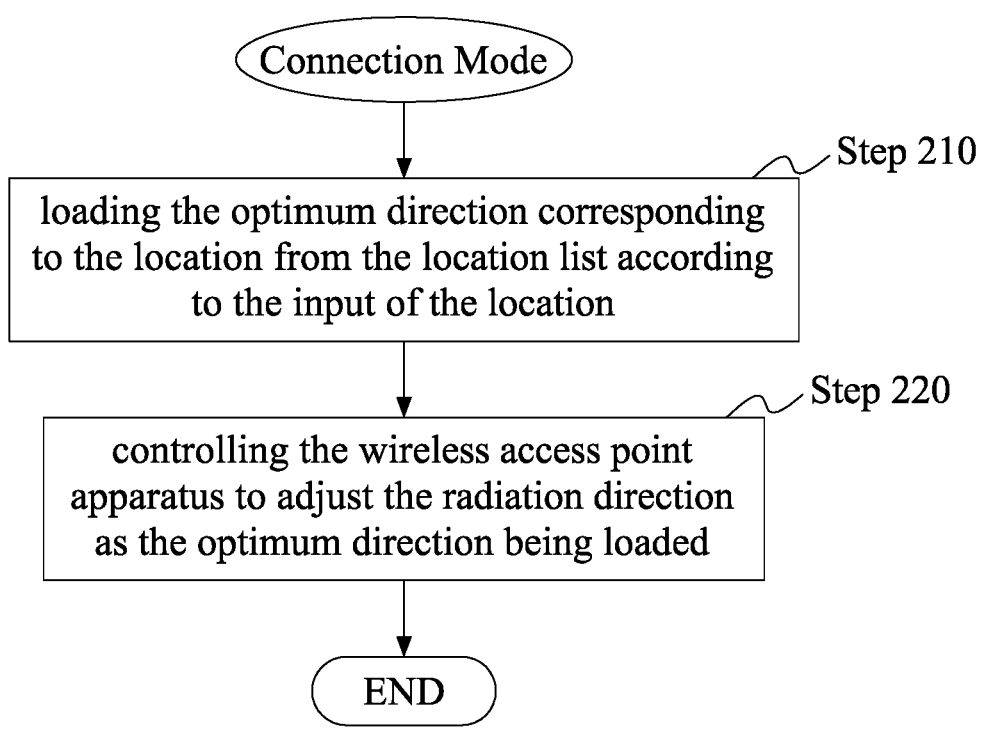

Please refer to FIGS. 11 and 12. In the connection mode, according to the input of the location, loading the optimum direction corresponding to the location from the location list, as shown in Step 210. Next, controlling the wireless access point apparatus 100 to adjust the radiation direction V as the optimum direction Vb being loaded, as shown in Step 220.

As shown in FIGS. 10 to 12, in practice, the connection mode begins from the Step 101. Therefore, if the inputted location does not exist in the location list 210, Step 122 is followed by Step 130, and the antenna control module 330 is now in the detection mode; in other words, the method executes Steps 130 to 150.

As shown in FIGS. 10 to 12, in practice, after Step 150, the antenna control module 330 may executes the connection mode to control the wireless access point apparatus to adjust the radiation direction as the optimum direction being loaded.

As shown in FIG. 12, in addition to the locations (P1 to P6), the optimum directions (Vb1 to Vb6) corresponding to the locations (P1 to P6), and the optimum signal receiving strength (SL1 to SL6) corresponding to the locations (P1 to P6), the location list 210 further records a location usage count (Fr1 to Fr6) at each of the locations (P1 to P6) where the portable electronic device 300 and the wireless access point apparatus 100 establish the wireless communication link. Before the antenna control module 330 enters into the detection mode, namely, receiving the input of the location (P1 to P6), the wireless access point apparatus 100, according to a location (P1 to P6) with a highest location usage count (Fr1 to Fr6), loads the optimum direction (Vb1 to Vb6) corresponding to the location (P1 to P6) having the highest location usage count (Fr1 to Fr6) and adjust the radiation direction V of the wireless signal S.

Figure 13:
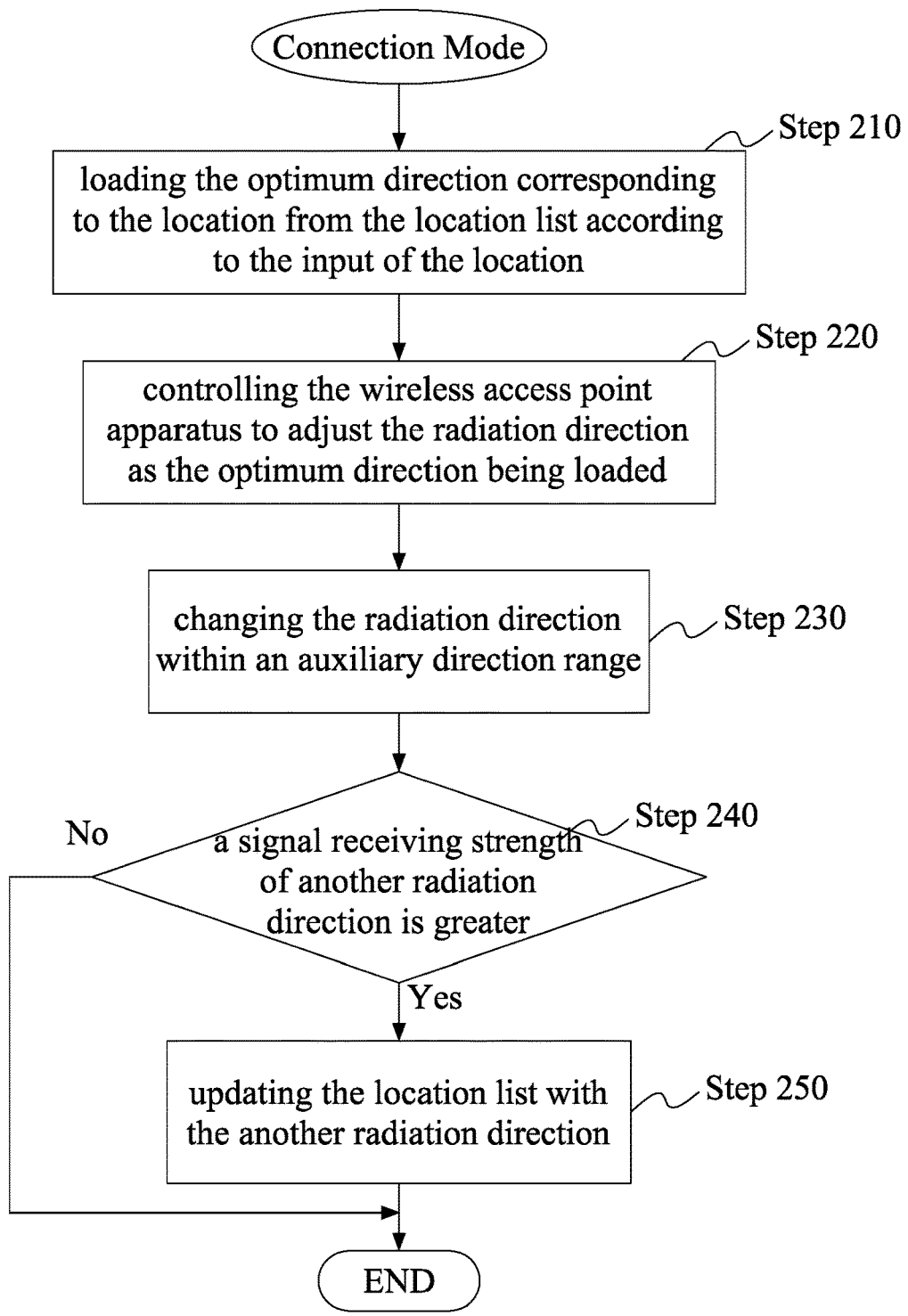
FIG. 13 illustrates a flowchart of another embodiment of the connection mode in the method.

As shown in FIG. 13, the antenna control module 330 of the portable electronic device 300 may load the optimum direction (Vb1 to Vb6) via the location list 210 and the inputted location (P1 to P6) to control the directional antenna(s) 112a of the wireless access point apparatus 100 to adjust the radiation direction V as the optimum direction (Vb1 to Vb6) being loaded. The antenna control module 330 of the portable electronic device 300 may take the optimum direction (Vb1 to Vb6) as a standard to control the wireless access point apparatus 100 to change the radiation direction V of the directional antenna(s) 112a of the wireless access point apparatus 100 within an auxiliary direction range, as shown in Step 230. The auxiliary direction range may be a small angle range, and the radiation direction V is changed within the range. For example, the optimum direction (Vb1 to Vb6) is taken as a standard, and the radiation direction V is changed by a small angle (e.g., not greater than 45 degrees) in the vertical direction and the horizontal direction. Next, the portable electronic device 300 analyzes if a signal receiving strength of another radiation direction V is greater than the signal receiving strength of the optimum direction (Vb1 to Vb6) in the auxiliary direction range with the signal strength-analyzing module 320, as shown in Step 240. If yes, the optimum direction (Vb1 to Vb6) and the optimum signal receiving strength (SL1 to SL6) are replaced by the another radiation direction V and the signal strength corresponding to the another radiation direction V, and the location list 210 is updated, as shown in Step 250. Accordingly, when the wireless transmission features of the wireless access point apparatus 100 and the portable electronic device 300 are changed caused by changes of hardware or environment, each of the optimum directions (Vb1 to Vb6) are also updated to its optimized state anytime to meet different situations.

Figure 14:
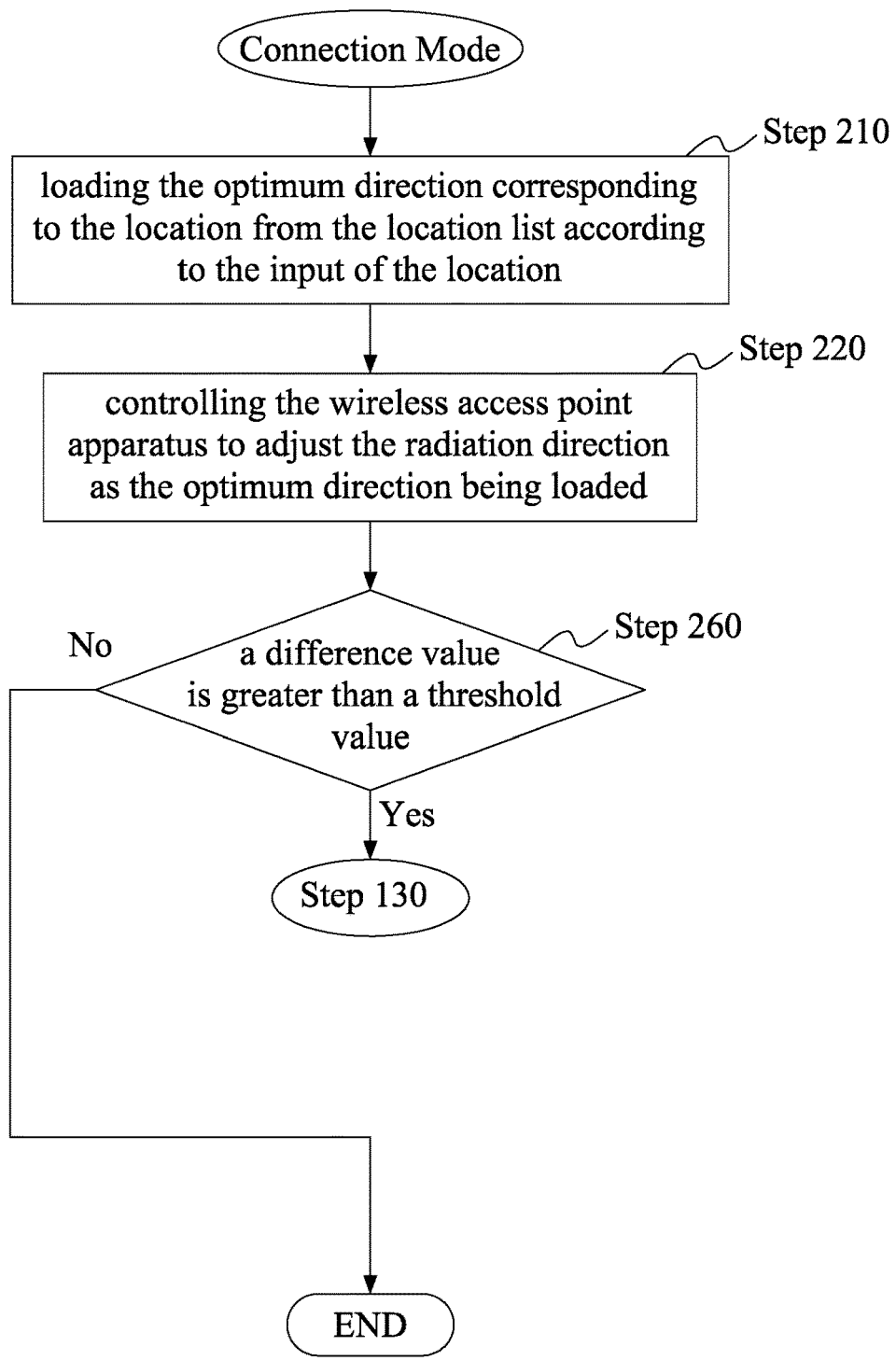
FIG. 14 illustrates a flowchart of yet another embodiment of the connection mode in the method.

As shown in FIGS. 12 and 14, in the detection mode, when the antenna control module 330 updates the location list 210 of the location-setting module 200 with the optimum direction (Vb1 to Vb6) and a location (P1 to P6) corresponding to the optimum direction (Vb1 to Vb6), at the same time the antenna control module 330 writes the optimum signal receiving strength (SL1 to SL6) corresponding to the optimum direction (Vb1 to Vb6) in the location list 210. In the connection mode, after the radiation direction V of the wireless signal S is adjusted as the optimum direction (Vb1 to Vb6) being loaded, the signal strength-analyzing module 320 of the portable electronic device 300 can analyze if a difference value between a real signal receiving strength and the optimum signal receiving strength (SL1 to SL6) corresponding to the optimum direction (Vb1 to Vb6) is greater than a threshold value, as shown in Step 260. If the difference value is greater than the threshold value, the original optimum direction (Vb1 to Vb6) is no more applicable, and the portable electronic device 300 is adapted to obtain the optimum direction (Vb1 to Vb6) having the optimum signal receiving strength (SL1 to SL6) again; that is, the method is back to the Step 130 to execute the detection mode.

Figure 15:
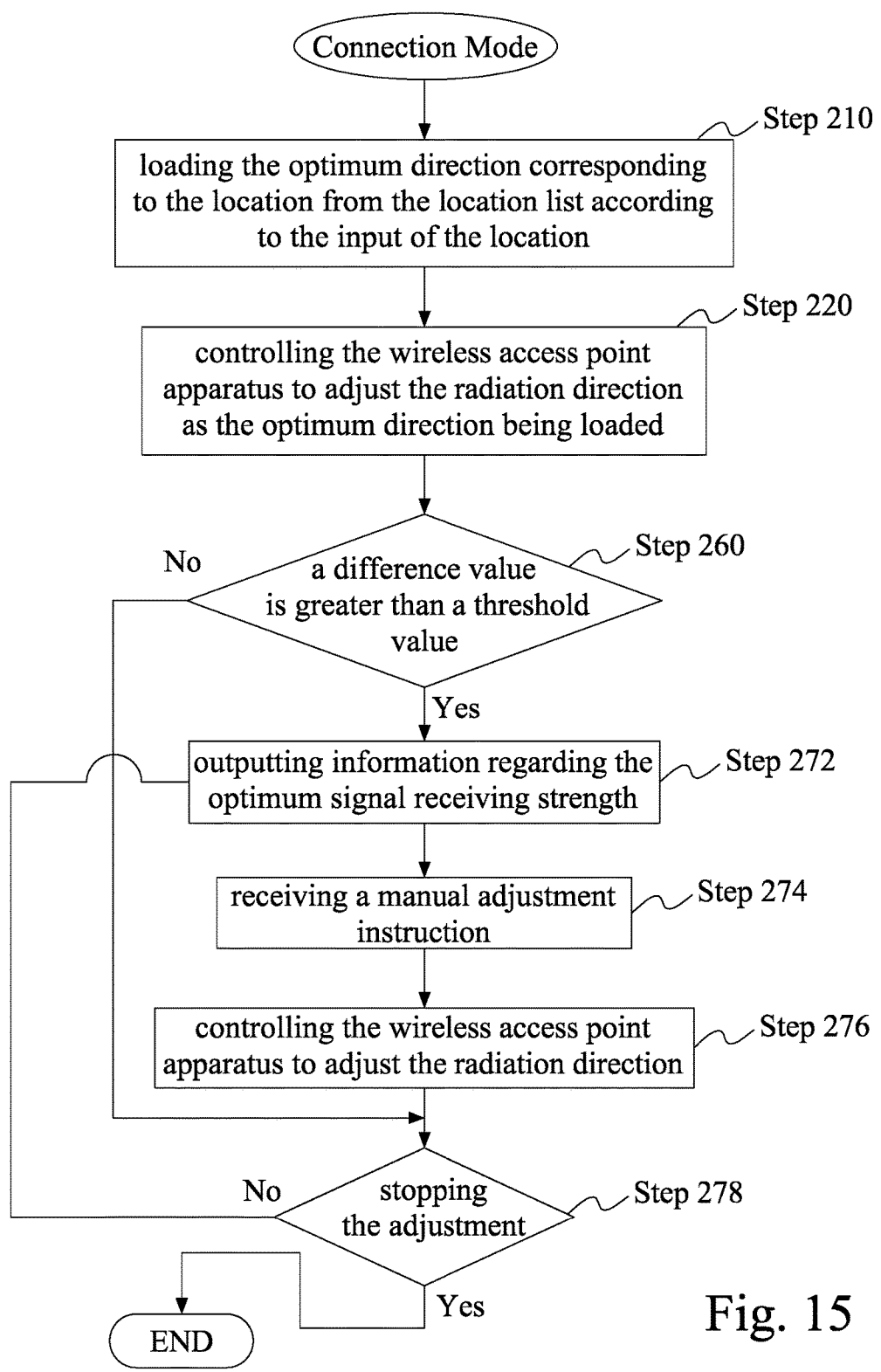
FIG. 15 illustrates a flowchart of still yet another embodiment of the connection mode in the method.

As shown in FIGS. 15 and 16, if the difference value is greater than the threshold value in Step 260, information regarding the optimum signal receiving strength (SL1 to SL6) may be outputted and displayed on the display of the portable electronic device 300, as shown in Step 272. The displayed information may include other messages like, as shown in FIG. 16, device name of the wireless access point apparatus 100, transmission speed, signal receiving strength, data flow, connection time, location usage count (Fr1 to Fr6). Specifically, the signal receiving strength may be presented as a level instead of an absolute value. Then, the portable electronic device 300 can receive a manual adjustment instruction to control the wireless access point apparatus 100 to adjust the radiation direction V, as shown in Step 274 and Step 276. The user may perform the adjustment repeatedly until the optimum signal receiving strength is obtained, and then the user can stop the adjustment (Step 278).

According to some embodiments of the instant disclosure, the radiation direction of the wireless access point apparatus can be controlled by the portable electronic device 300 to have an optimum or acceptable signal strength, based on the location of the portable electronic device 300. Therefore, the adverse effects of the signal receiving location toward the signal strength can be reduced effectively.

What is claimed is:

1. A wireless access point system, comprising:
   a wireless access point apparatus, having a directional antenna unit and an antenna-adjusting unit; wherein
   the directional antenna unit is adapted to radiate a wireless signal having a radiation direction; and
   the antenna-adjusting unit is adapted to receive a control instruction to adjust the radiation direction of the wireless signal;
   a storage device storing a location list, the location list recording a location and an optimum direction corresponding to the location; and
   a portable electronic device establishing a wireless communication link with the wireless access point apparatus, the portable electronic device having a wireless signal transceiver and a central processing unit; wherein the portable electronic device includes a detection mode and a connection mode and is arranged such that in the detection mode, the central processing unit generates the control instruction, and the wireless signal transceiver transmit the control instruction to control the wireless access point apparatus to radiate the wireless signal and change the radiation direction within a specified direction range; the wireless signal transceiver receives the wireless signal and the central processing unit analyzes the wireless signal to obtain the optimum direction having an optimum signal receiving strength, so that the central processing unit updates the location list in the storage device with the optimum direction and the location corresponding to the optimum direction;
   in the connection mode, the central processing unit receives the input of the location, loads the optimum direction corresponding to the location according to the location list in the storage device, and controls the radiation direction to be adjusted as the optimum direction being loaded.

2. The wireless access point system according to claim 1, wherein the directional antenna unit comprises at least two directional antennas, and the antenna-adjusting unit is adapted to adjust signal outputs of the at least two directional antennas to provide the wireless signal and the radiation direction.

3. The wireless access point system according to claim 1, wherein the directional antenna unit comprises at least one directional antenna, the antenna-adjusting unit is a rotatable base holding the at least one directional antenna and adjusting the radiation direction of the wireless signal.

4. The wireless access point system according to claim 1, wherein the location list further records a location usage count at the location where the portable electronic device and the wireless access point apparatus establish the wireless communication link; before the central processing unit enters into the detection mode, the wireless access point apparatus, according to a location having a highest location usage count, loads the optimum direction corresponding to the location having the highest location usage count and adjust the radiation direction of the wireless signal.

5. A portable electronic device able to control antenna direction of wireless access point apparatus, the portable electronic device adapted to receive a wireless signal having a radiation direction radiated by a wireless access point apparatus, and the portable electronic device adapted to establish a wireless communication link with the wireless access point apparatus, the portable electronic device comprising: a storage device, a wireless signal transceiver and a central processing unit wherein the portable electronic device includes a detection mode and a connection mode and is arranged such that
   the storage device stores a location list, and the location list records a location and an optimum direction corresponding to the location;
   in the detection mode, the central processing unit generates a control instruction to control the wireless access point apparatus with the control instruction, and the central processing unit controls the wireless access point apparatus to radiate the wireless signal and change the radiation direction in a specified direction range, the wireless signal transceiver receives the wireless signal and the central processing unit analyzes the wireless signal to obtain an optimum direction having an optimum signal receiving strength, so that the central processing unit updates the location list in the storage device with the optimum direction and the location corresponding to the optimum direction; and
   in the connection mode, the central processing unit receives the input of the location, loads the optimum direction corresponding to the location according to the location list in the storage device, and controls the radiation direction of the wireless signal radiated by the wireless access point apparatus to be adjusted as the optimum direction being loaded.

6. The portable electronic device according to claim 5, wherein the location list further records a location usage count at the location where the portable electronic device and the wireless access point apparatus establish the wireless communication link; before the central processing unit enters into the detection mode, the wireless access point apparatus, according to a location having a highest location usage count, loads the optimum direction corresponding to the location having the highest location usage count and adjust the radiation direction of the wireless signal.

7. The portable electronic device according to claim 5, wherein in the connection mode, if the inputted location does not exist in the location list, the central processing unit stops the connection mode and starts the detection mode.

8. The portable electronic device according to claim 5, wherein the central processing unit executes the connection mode after executing the detection mode.

9. The portable electronic device according to claim 5, wherein after the radiation direction of the wireless signal radiated by the wireless access point apparatus is adjusted as the optimum direction being loaded, the central processing unit takes the optimum direction as a standard to control the wireless access point apparatus to change the radiation direction within an auxiliary direction range; and the central processing unit if a signal receiving strength of another radiation direction is greater than the signal receiving strength of the optimum direction, if yes, the optimum direction is replaced by the another radiation direction and the location list is updated.

10. The portable electronic device according to claim 5, wherein:
   when the central processing unit updates the location list of the storage device with the optimum direction and the location, at the same time the central processing unit writes the signal receiving strength corresponding to the optimum direction in the location list; and
   after the central processing unit controls the wireless access point apparatus to adjust the radiation direction of the wireless signal as the optimum direction being loaded, the central processing unit analyzes if a difference value between a real signal receiving strength and the signal receiving strength of the optimum direction is greater than a threshold value; if the difference value is greater than the threshold value, the central processing unit executes the detection mode again.

11. A method for optimizing an antenna direction of wireless access point apparatus with a portable electronic device, comprising:
   utilizing the portable electronic device to receive a wireless signal radiated by a wireless access point apparatus;
   utilizing the portable electronic device to receive an input of a location and updating the location in a location list;
   utilizing the portable electronic device to transmit a control instruction to control the wireless access point apparatus to radiate the wireless signal and change a radiation direction within a specified direction range;
   utilizing the portable electronic device to analyzes a signal receiving strength of the wireless signal and the radiation direction corresponding to the signal receiving strength to obtain an optimum direction having an optimum signal receiving strength; and
   utilizing the portable electronic device to establish a correspondence between the optimum direction and the location in the location list.

12. The method according to claim 11, further comprising a step of:
   after the input of the location is received, utilizing the portable electronic device to check if the location exists in the location list;
   if the location does not exist in the location list, the portable electronic device executing subsequent steps; and
   if the location exists in the location list, according to the input of the location, the portable electronic device loading the optimum direction corresponding to the location from the location list and controlling the wireless access point apparatus to adjust the radiation direction as the optimum direction being loaded.

13. The method according to claim 12, wherein the location list further records a location usage count at the location where the wireless access point apparatus establishes a wireless communication link; before the wireless access point apparatus receives the input of the location, the wireless access point apparatus, according to a location having a highest location usage count, loads the optimum direction corresponding to the location having the highest location usage count and adjust the radiation direction of the wireless signal.

14. The method according to claim 12, further comprising a step of:
   after the radiation direction of the wireless signal radiated by the wireless access point apparatus is adjusted as the optimum direction being loaded, the portable electronic device changing the radiation direction within an auxiliary direction range by taking the optimum direction as a standard and analyzing if a signal receiving strength of another radiation direction is greater than the signal receiving strength of the optimum direction; if yes, the portable electronic device replacing the optimum direction by the another radiation direction and updating the location list.

15. The method according to claim 12, further comprising a step of:
   after the radiation direction of the wireless signal is adjusted as the optimum direction being loaded, the portable electronic device analyzing if a difference value between a real signal receiving strength and the signal receiving strength of the optimum direction is greater than a threshold value; if the difference value is greater than the threshold value, the portable electronic device obtaining the optimum direction having the optimum signal receiving strength again.

* * * * *